United States Patent

[11] 3,581,180

[72] Inventors Alexander Russell; Alastair Gordon Millar, both of National Engineering Lab., East Kilbride, Glascow, Scotland
[21] Appl. No. 803,294
[22] Filed Feb. 28, 1969
[45] Patented May 25, 1971
[32] Priority Feb. 29, 1968
[33] Great Britain
[31] 9955/68

[54] HIGH SPEED ABSOLUTE POSITION CONTROLS
14 Claims, 10 Drawing Figs.
[52] U.S. Cl. .................................................. 318/608, 318/663
[51] Int. Cl. ...................................................... G05b 1/06
[50] Field of Search ...........................................318/20.250, 20.370, 20.745

[56] References Cited
UNITED STATES PATENTS

| | | | |
|---|---|---|---|
| 3,051,881 | 8/1962 | Baudin | 318/29 |
| 3,193,744 | 7/1965 | Seward | 318/18 |
| 3,258,776 | 6/1966 | Boyle et al. | 318/19X |
| 3,297,925 | 1/1967 | Masel | 318/28 |
| 3,308,360 | 3/1967 | Vanderbilt | 318/18 |
| 3,431,474 | 3/1969 | Van Ostrand | 318/18 |
| 3,444,446 | 5/1969 | Burg et al. | 318/18 |

Primary Examiner—Benjamin Dobeck
Attorney—Cushman, Darby and Cushman

ABSTRACT: An arrangement for controlling the positioning of a movable object by power drive means along a defined movement path in accordance with an applied digital position command which comprises power drive means operative to cause movement of said object in either direction along said path, electric waveform generating means for generating at least two families of electric waveforms related to the absolute position of said object, each of said families comprising a group of different waveforms which each pass through a chosen datum level of amplitude at different positions of said object along its movement path, the unit distance displacement between adjacent waveforms of one group being an integral multiple of the unit distance displacement of the other family or families, position selection means for selecting under said applied digital position command particular position defining waveforms derived one from each of said families of waveforms, datum level detection means operative to provide a control signal in response to passage of an applied waveform signal through said datum level, servo control means for causing operation of said power drive means in one or other direction in response to an applied error signal and cyclically operable step-by-step switch means for successively applying said selected position defining waveforms in turn and in progressively decreasing order of unit displacement distance to said datum level detection means and said servo control means, the control signals from said datum level detection means being operative to control the step-by-step operation of said cyclically operable switch means.

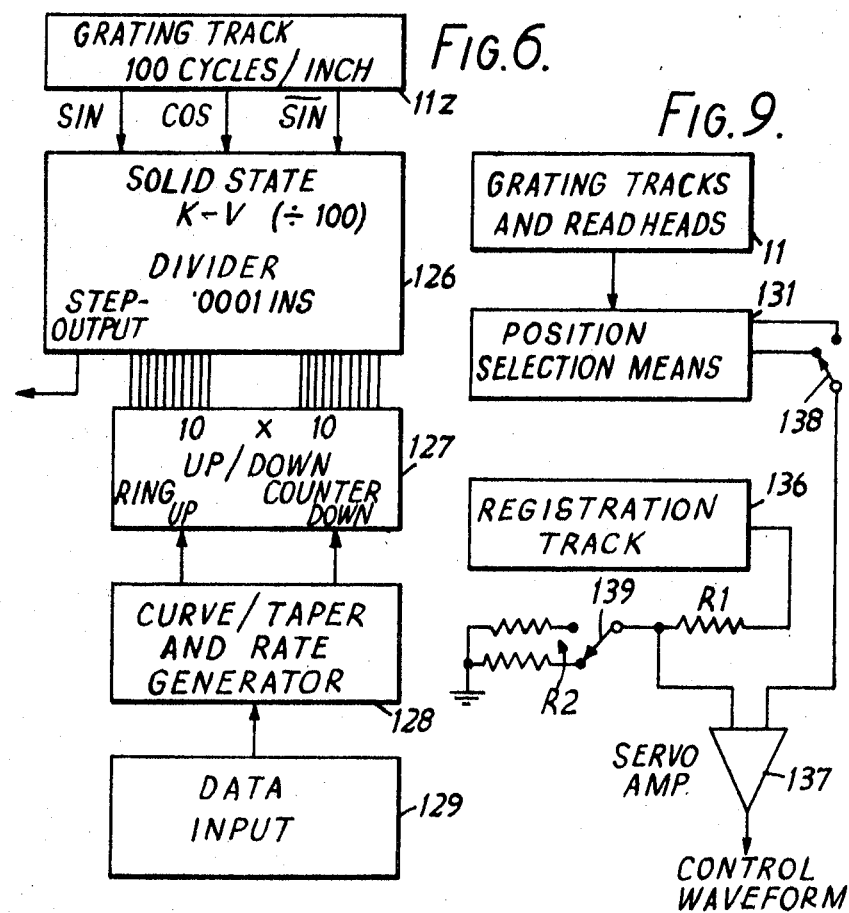
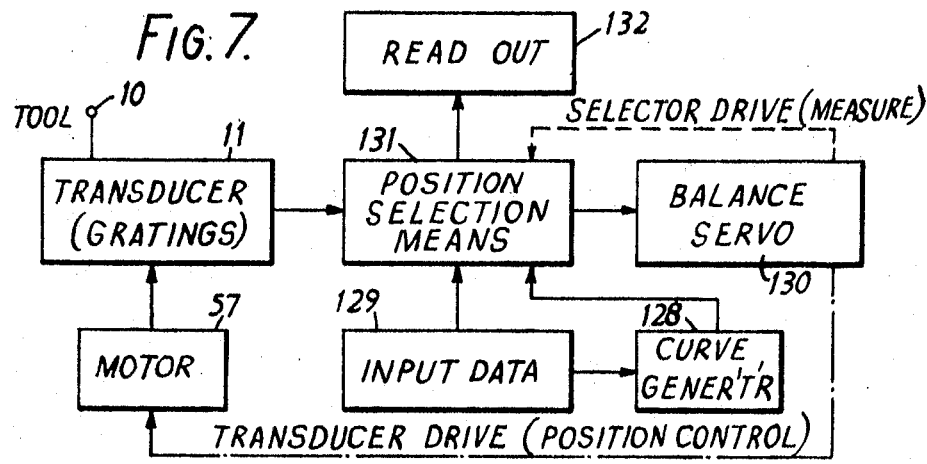

HIGH SPEED ABSOLUTE POSITION CONTROLS

This invention relates to systems and apparatus arrangements for effecting absolute position control of a movable object in accordance with an appropriate digital position command signal. Particular, although by no means exclusive, applications of the invention are to master etching machines, star-plate and other type scanners, high speed digital plotters for handling computer outputs and microelectronic apparatus manufacture.

This invention employs the techniques involving the generation of families of electric current or voltage waveforms related to the absolute position of the movable object from optical gratings or other means operated by displacement of such object as described in U.S. Pat. No. 3,500,055 dated March 10th 1970 to Alexander Russell and Leonard Alfred Sayce, assignors to National Research Development Corporation, for "Multitrack optical grating for providing phase-displaced waveforms indicative of the position of a movable object," and in copending Patent Applications Ser. No. 570,526 filed Aug. 5th 1966 for "Positional displacement transducer arrangements" and Ser. No. 695,460 filed Jan. 3rd 1968 for "Control systems for machine tools," both of Alexander Russell, assignor of both to National Research Development Corporation. Each of such families of waveforms comprises a group of, say, 10 similar sinusoidal or seriesoidal (triangular) waveforms which each pass through a datum level of amplitude, most conveniently zero amplitude, at different positions of the movable object along its path of defined movement. Thus one family of such waveforms may serve to define the position of the object in terms of 1-inch steps, another family may serve to define the position of such object in terms of 0.1-inch steps within any one of the coarser 1 inch steps, another family may serve to define the position of the object in terms of 0.01-inch steps within any one of said 0.1-inch steps and yet another family may serve to define the position of the object within any one of such 0.01-inch steps.

One object of he present invention is to provide a control system for effecting the positioning of an object by power drive means in response to a digital form command which is capable of high operating speeds and with high accuracy and repeatability.

In an arrangement according to this invention a servo or similar control for the power drive means operative to cause movement of the object is supplied with an input error signal which is derived, during successive stages of the positioning operation, from a particular one or a particular pair of the waveforms of each family selected in accordance with the value of the related command digit, the selected waveform or waveforms from each family being rendered operative in turn in order of decreasing significance of step distance and with the transfer from each currently effective family to the next made dependent upon reduction of the then available input error signal to a balance indicating level, such as zero.

In order that the nature of the invention may be more readily understood a number of embodiments thereof will now be described with reference to the accompanying drawings in which:

FIG. 1 is a schematic diagram of one form of apparatus for effecting absolute position control of a movable object by means of a digital command and embodying the present invention.

FIG. 2 comprises a number of waveform diagrams for explaining the manner of operation of the arrangements shown in FIG. 1.

FIG. 6 is a block schematic diagram of another modification.

FIG. 7 is a block schematic diagram showing a modified arrangement suitable for use of the basic arrangements in a static measurement mode with digital read-out of the measured value.

FIG. 9 is a mainly block schematic diagram of a modified arrangement for facilitating initial alignment and subsequently providing automatic correction against transverse displacement movement of the gratings, while

Figure 1:
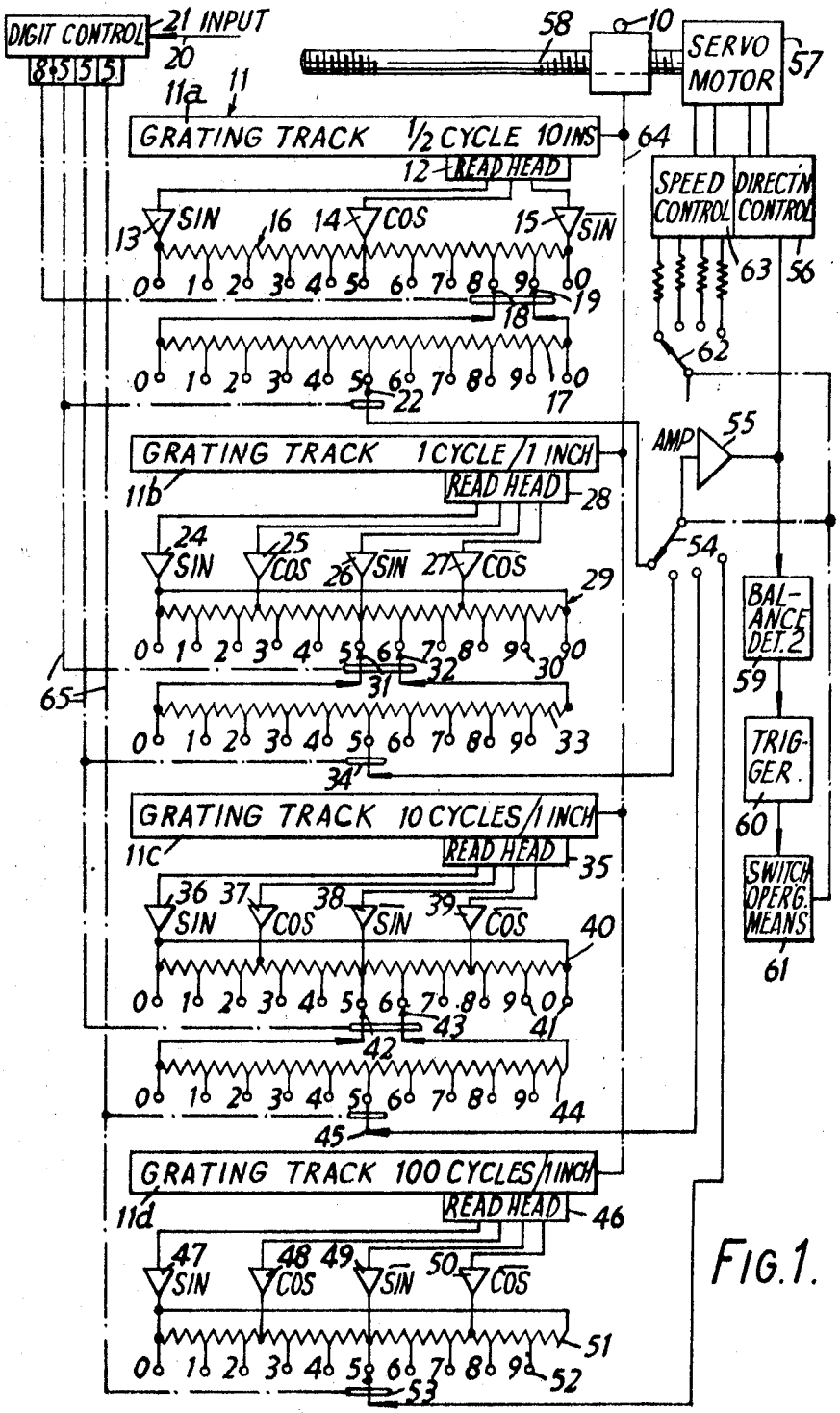
Figure 2:
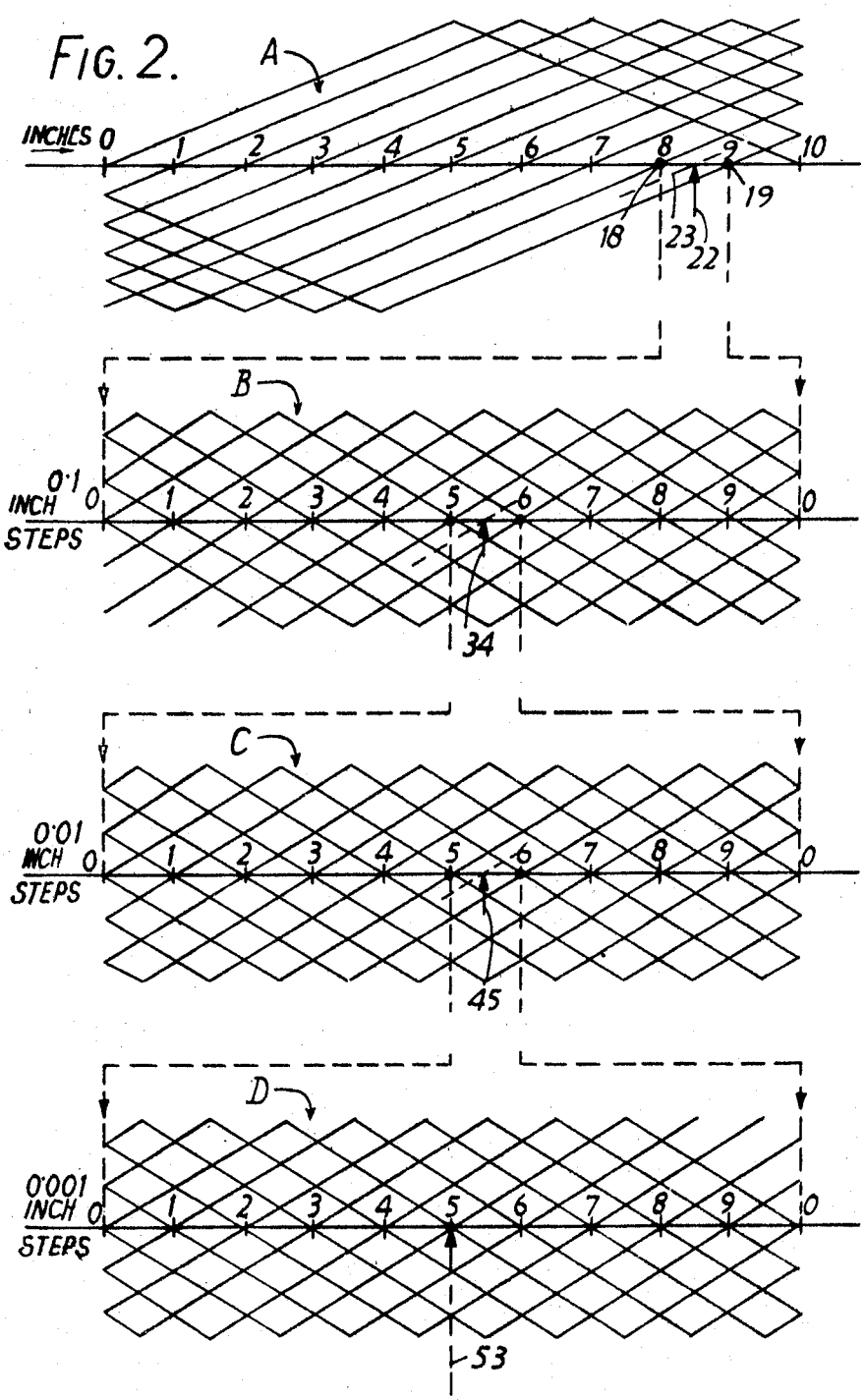

The embodiment first to be described with reference to FIGS. 1 and 2 is an arrangement for causing positioning of an object 10, e.g. a recording pen, to any position along a rectilinear path of 10 inches length to a resolution accuracy of 0.001 inch under the control of a 4 decimal digit control. The arrangement may form the position control means for one axis of an X-Y plotting table; the arrangements for control along the other axis of such table could be identical.

In the arrangement shown the movable object 10 is coupled, by link means indicated schematically at 64, to a four track optical grating 11 and associated photoelectric reading means similar to those described in the above-mentioned U.S. Pat. No. 3,500,005. The coarsest grating track $11a$ is arranged with only one half cycle (180°) of position information within its total length of 10 inches, the next finer track $11b$ has one information cycle per inch, the next track $11c$ has one information cycle per 0.1 inch while track $11d$, the finest track, has one information cycle per 0.01 inch. Such last track $11d$ is the one which ultimately determines the final position reached by the object 10 and is termed the measuring track.

Referring now particularly to FIG. 1 of the drawings, the grating track $11a$ is arranged, through the associated reading means 12, to provide three outputs representing respectively Sin, Cos and $\overline{\text{Sin}}$ values. These outputs are applied through individual amplifiers 13, 14, 15 to appropriately positioned tapping points on a 10-section resistive potentiometer network 16 for deriving a family of waveforms in a manner analogous to that described in the aforementioned copending applications. The control waveforms thus produced are shown in idealized form at A in FIG. 2. As will be seen from FIG. 2, a waveform passing through a zero datum level is provided at 1-inch intervals. The resistive network 6 is arranged as a Kelvin-Varley divider with another 10-section resistive divider network 17 connected across the movable tappings 18, 19 of the network 16. The position of the double tappings 18, 19 on the network 16 is arranged, as described later, to be controlled through means indicated schematically at 65 by the most significant digit of the input command 20 applied to digital control means 21. As shown in FIG. 1, such most significant digit is value '8.' The position of the single movable tapping 22 on the network 17 is determined by the next lower significant digit of the input command 20 applied to the control means 21. As shown in FIG. 1, such digit is value '5.' The resultant interpolation waveform available at the tapping 22 is accordingly one as shown in dotted lines at 23 in FIG. 2, i.e. one which passes through a zero datum level when the object 10 is approximately midway between positions 8 and 9 inches.

Referring again to FIG. 1, the grating track $11b$ provides, through the associated reading head means 28, four 90° phase displaced outputs which are fed respectively through amplifiers 24, 25, 26 and 27 to a resistive network 29 which is of endless ring form. The four inputs to the network 29 are at equispaced points around the ring which has output taps 80 providing a family of control signals as shown in idealized form at B in FIG. 2. One cycle of any waveform of this family corresponds to movement of the object 10 by a distance of 1 inch and a waveform passing through the zero datum level is provided at each 0.1-inch interval. As shown in FIG. 1, this network 29 is also arranged as a Kelvin-Varley divider with another 10-step potentiometer network 33 connected across the movable pair of tappings 31, 32 operative along the network 29. The position of the tappings 31, 32 is determined by the value of the already mentioned next-to-most significant command digit (5 in the example shown) while the position of the single movable tapping 34 on the network 33 is determined by the value of the input command digit of next lower significance as applied to the control means 21. As shown this digit is also of value '5' (in the example shown).

As may be seen from FIG. 1, the next grating track 11c is arranged in similar manner to track 11b to provide through its associated reading means 35, four 90° phase displaced waveforms which are fed respectively through amplifiers 36, 37, 38, 39 to equispaced input tapping points on a further ring-form resistive network 40 provided with output taps 41. The outputs at these taps 41 constitute a third family of control signals as shown in idealized form at C in FIG. 2. One cycle of any waveform of this family corresponds to movement of the object 10 by a distance of 0.1 inch and a waveform passing through the zero datum level is provided at each 0.01-inch interval. This network 40 is also arranged as a Kelvin-Varley divider by the connection of a further 10-step resistive potentiometer network 44 across the pair of tappings 42, 43 operative along the taps 41.

The position of the pair of tappings 42, 43 is determined by the above-mentioned next lower significant command digit (5) which also controls the position of tapping 34 while the position of the single movable tapping 45 on the network 44 is determined by the value of the least significant of the input command digits (also shown as of value '5').

The finest, measurement, grating track 11d is arranged through its associated reading means 46 to provide four 90° phase displaced waveforms which are fed respectively through amplifiers 47, 48, 49, 50 to equispaced input tapping points on a final ring-form resistive network 51 provided with output taps 52. The outputs at these taps 52 constitute a fourth family of control waveforms as shown at D in FIG. 2. One cycle of this family corresponds to movement of the object 10 by a distance of 0.01 inch and a waveform passing through the zero datum level is provided at each 0.001-inch interval. A single output tapping 53 cooperates with the taps 52 and its position is controlled in accordance with the value (5) of the least significant digit of the input control.

The respective error signal outputs from the movable tappings 22, 34, 45 and 53 are connected to different inputs of a four position selector switch 54 to allow connection of each in turn as an input error or control signal to a servo control system through an amplifier 55. The amplifier output is applied to means 56 for controlling both the running and direction of running of an electric servo motor 57 operative to move the object 10 along a 10 inch rectilinear movement path as by means of a lead screw 58. The error signal output from the amplifier 55 is also applied to balance detecting means 59, such as a voltage sensing circuit, for detecting the instant of arrival of the amplitude of the applied error signal at the chosen, e.g. zero, datum level. The resultant balance output signal is operative, as by way of a trigger circuit 60, to cause momentary energization of switch operating means 61, such as an electromagnet, to alter the position of the switch 54 step by step from its first position where the tapping 22 is connected to the amplifier 55 to the final position where the tapping 53 is connected to such amplifier. A second four position switch 62 may be provided and ganged to the switch 54 for operating speed control means 63 associated with the servo motor 57.

In the operation of the arrangement as just described, an input digital command applied to the digit control means 21 causes setting of the various divider network tappings in accordance with the different digit values.

Thus, with the specific example shown, the most significant digit value '8' causes the double tappings 18, 19 to register with the '8' and '9' output taps on the network 16 while the single tapping 22 is registered with the '5' tap on the second network 17. Assuming the object 10 is not already at the signalled position, the signal provided from the tapping 22 to the amplifier 55 through switch 54 in its first position will have a nonzero amplitude and a polarity such that, through the direction control means 56, the motor 57 is energized to run at a fast, speed set by speed control means 63 in the correct direction to move the object 10 towards the desired signalled position. As may be seen more clearly from FIG. 2 the two tappings 18, 19 pick up waveforms of the family A which are effectively 1 inch apart in terms of the object position and by transferring these to across the potentiometer 17 it becomes possible, through the tapping 22 on the latter, to derive an interpolation waveform 23 which passes through the datum zero level at any chosen subdivision position between '8' and '9,' i.e. in the example shown, at the position corresponding to the value '5' of the next lower significant input digit. In consequence, the error signal output from the tapping 22 to the amplifier 55 and balance detector 59 will reach the zero datum level when the object 10 reaches the position of approximately 8.5 inches from the measurement reference position. The instant of reaching zero datum level is marked by operation of the switch operating means 61 through trigger circuit 60 by the balance detector 59 and the consequential movement of switches 54 and 62 to their next positions. Switch 62 causes the operating speed of the motor 57 to be reduced while switch 54 transfers the amplifier input to receive error signals from the tapping 34 on potentiometer 33. As may be seen from FIG. 2, this means that position control has been transferred from the waveform family A to the waveform family B whereby the now-operative tappings 31, 32 pick up respective waveforms which are 0.1 inch apart in terms of the object movement. By means of the tapping 34 it is possible to derive an interpolation waveform which passes through the zero datum level at the chosen subdivision (in the example '5') within the 0.1-inch step. Owing to the previous operation using the first waveform family A the object 10 is already within the correct 0.1-inch range so that, through similar repeated operation of the means 56, the motor 57 is driven to move the object approximately into the position defined by the three input position digits '8.55.' When this position is reached the interpolation waveform derived from the tapping 34 passes through the zero datum level whereupon the balance detector 59 causes further operation of switch operating means 61 to step switches 54 and 62 to their respective third positions. As may be seen from FIG. 2, this causes transfer of control to the waveform family C whereby the now operative tappings 42, 43 pick up waveforms which are 0.01 inch apart in terms of object movement. In a manner similar to that already described above, the setting of the tapping 45 provides an interpolation waveform which passes through the zero datum level at a position approximately corresponding to the value '5' of the least significant control digit. Upon reaching this position the balance detector 59 again operates to step switches 54 and 62 to their final positions in which the motor 57 is operated at its slowest speed under the control of the waveform family D of which adjacent waveforms are 0.01 inch apart in terms of object movement. Adjustment of the tapping 53 provides for selection of that waveform which passes through the zero datum level precisely at the signalled '5' (0.001-inch step) position. The arrival of the object at its final position, '8.555' inches from reference, causes further operation of the switch operating means 61 to return switches 54 and 62 to their respective initial positions in readiness for the next operation cycle upon receipt of a new digital command input.

Figure 3:
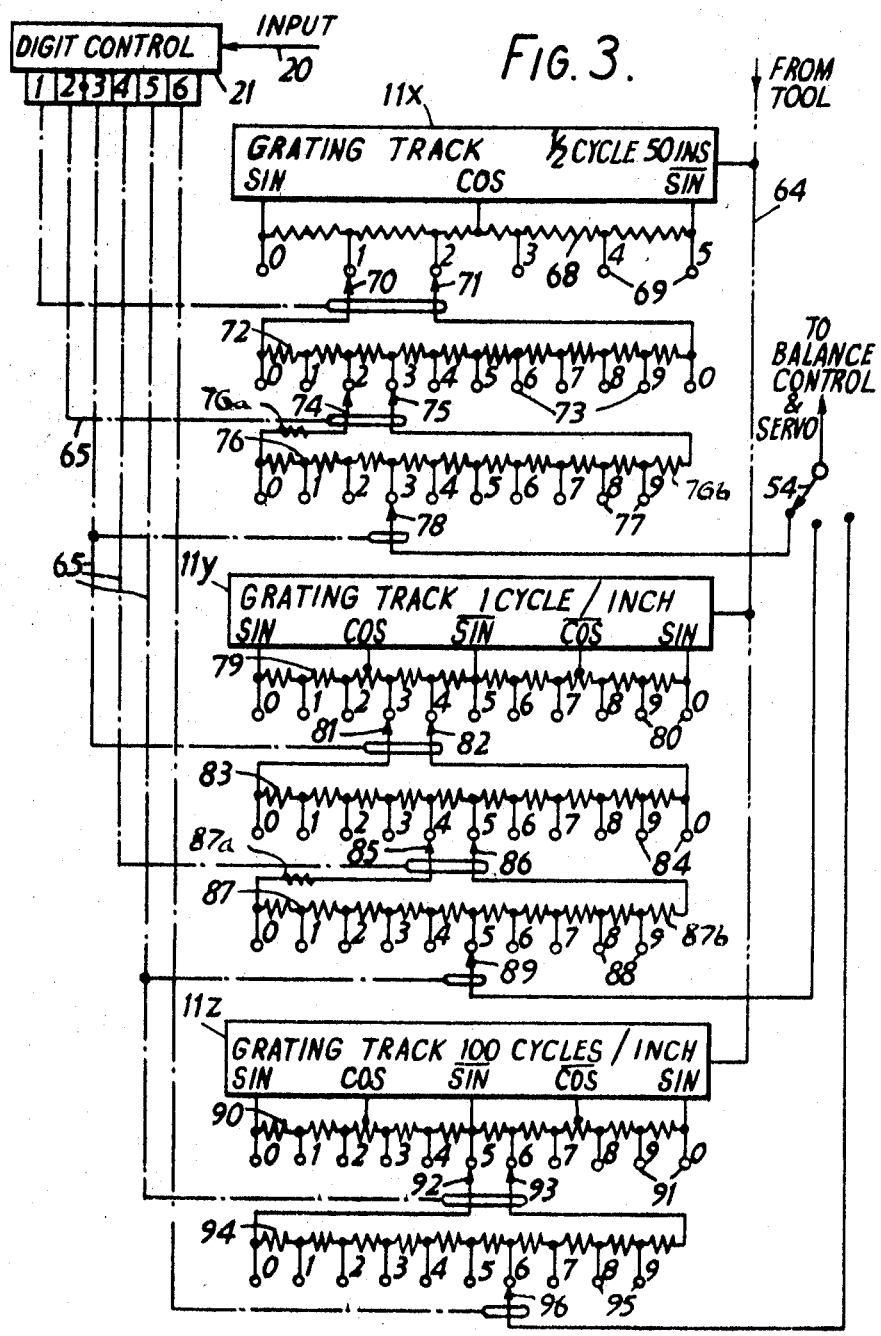
FIG. 3 is a schematic diagram, similar to FIG. 1, showing a modified form of apparatus in accordance with another embodiment of the invention.

FIG. 3 illustrates a modified arrangement in which the Kelvin-Varley principle is extended to permit the use of grating tracks having a division ratio of 100 to one another. In this way a three grating track arrangement may be used to provide a position control to an accuracy of 1 part in $10^6$. In the particular example as shown a movable object may be directed to any position along a chosen movement path of 50 inches length to a resolution accuracy of 0.0001 inches.

In this figure (in which components corresponding to those of FIG. 1 have been given similar reference characters) the first or coarsest grating track 11x has one half cycle of position information within its total length of 50 inches and provides three 90° phase displaced output waveforms to a first resistive network 68 having taps 69. A pair of movable tappings 70, 71 are connected respectively to the ends of a second resistive network 72 having taps 73. A second pair of movable tappings 74, 75 cooperating with the taps 73 are connected respectively to the ends of a third resistive network 76 provided with taps 77 engageable by a single movable tapping 78 which provides an error signal output to the first position of the switch 54. The position of the tapping pair 70, 71 is controlled in accordance with the value of the most significant input digit (1) while the position of the tapping pair 74, 75 is controlled in accordance with the value of the next-to-most significant digit (2). The tapping 78 is positioned in accordance with the value of the next lower significant digit (3).

The next grating track 11y has one information cycle per inch length and provides four 90° phase displaced waveforms to equispaced points on a ring-form resistive network 79 having taps 80 engageable by a tapping pair 81, 82 whose position is controlled in accordance with the signalled value of the third input digit (3), i.e. that which also controls the position of tapping 78. These tappings 81, 82 are connected respectively to the ends of a second resistive network 83 having taps 84 engageable by a further pair of tappings 85, 86 whose position is controlled in accordance with the signalled value of the fourth input digit (4). Such tappings 85, 86 are connected respectively to the ends of a third resistive network 87 having taps 88 engageable by a single movable tapping 89 whose position is controlled in accordance with the value of the fifth input digit (5). The error signal output from this tapping 89 is applied to the second position contact of the switch 54.

The third, measurement, track 11z of the grating has one information cycle per 0.01 inch of its length and provides four 90° phase displaced output waveforms to equispaced tapping points of a ring-form resistive network 90 having taps 91. The latter are engaged by a movable tapping pair 92, 93 whose position is controlled in accordance with the signalled value of the aforesaid fifth input digit (5). These tappings are connected to the ends of a second resistive network 94 having taps 95 engageable by a single movable tapping 96 whose position is controlled in accordance with the signalled value of the sixth or least significant input digit (6). The error signal output from this tapping 96 is fed to the third position contact of the switch 54 which, in this embodiment, has only three positions. The ganged switch 62, when provided, also has only three positions.

The manner of operation of this embodiment will be self-evident from the description already given for that shown in FIGS. 1 and 2. The additional tapped networks 76, 87 and 94 serve, effectively, to provide an additional interpolation waveform at each switching step of the switch 54.

The various components of either of the arrangements described may take a number of different practical forms.

Figure 4:
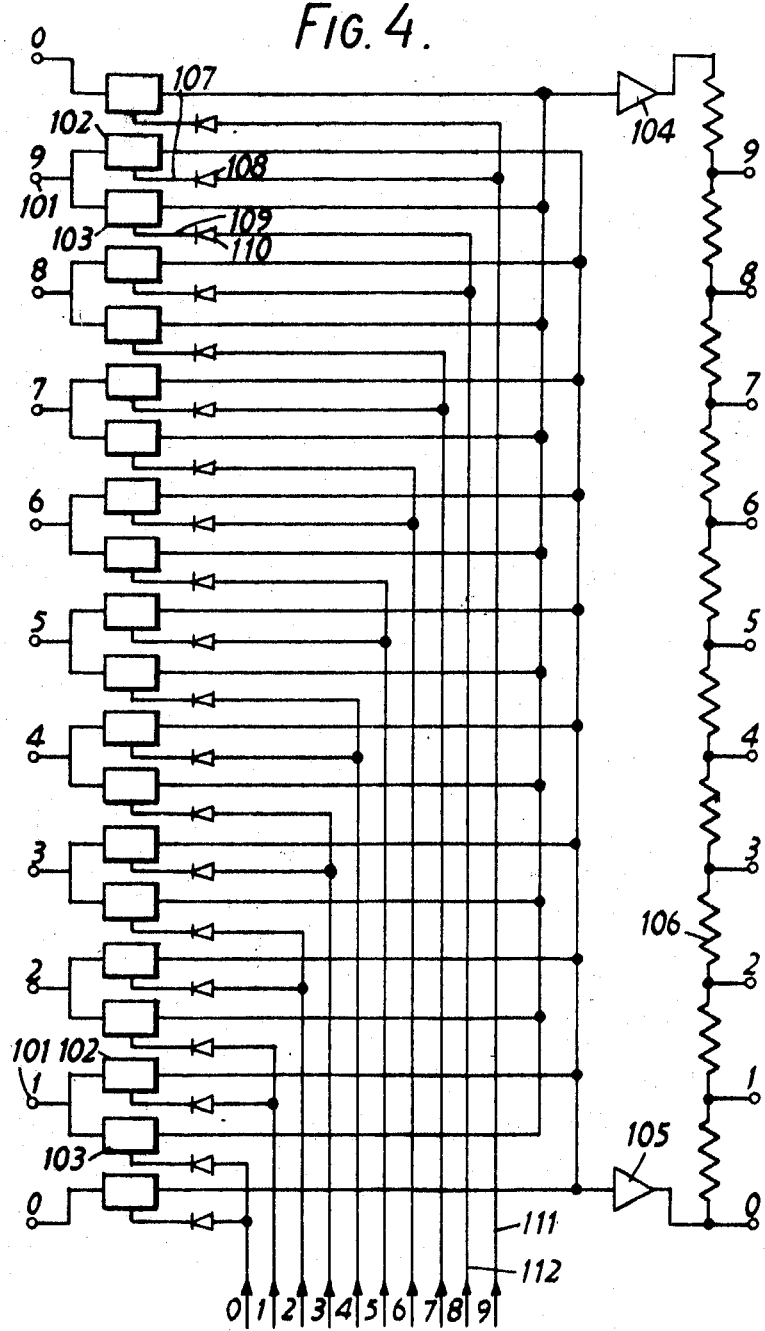
FIG. 4 is a more detailed schematic diagram illustrating a particular form of switch control using solid state electronic circuitry.

The balance detector 59 and trigger circuit 60 may comprise a device of the Schmitt trigger type. The digital control input may be of manual character with each of the movable tappings in the form of a manually operable switch. Alternatively the requisite switching may be effected electrically as by means of relays whose settings are controlled by input signals derived, for instance, from decoded information on punched tape. In a further alternative, particularly adapted for high speed operation with information provided from magnetic tape or a computer output, electronic switching means may be employed. These are preferably of the solid state or integrated circuit type. A particularly convenient electronic switching element is a MOST (metal oxide silicon transistor) device and a circuit arrangement employing such devices to provide an adjustable tapping pair, similar to the pair 18, 19, FIG. 1, under electric signal control, is shown in FIG. 4.

In this figure, each input tapping 101 supplies signals to a pair of MOST devices 102, 103. One MOST device 102 of each pair provides, when conductive, a low resistance circuit path to a first buffer amplifier 105 supplying one end of the following resistive network 106 while the other MOST device 103 of such pair similarly provides, when conductive, a low resistance path to a second buffer amplifier 104 supplying the opposite end of the network 106. The control input 107 of the MOST device 102 is connected by way of blocking diode 108 to one digital control input lead, e.g. that shown at 111 for value '9' whereas the control input 109 of the other MOST device of the pair is connected by way of blocking diode 110 to the digital control input lead of the next adjacent, e.g. that shown at 112 for value '8.' Thus, when any one control input lead, such as lead 112 is supplied with the appropriate potential to render the associated MOST devices of low resistance, one MOST device of one particular pair serves to connect its related input tapping 101 to the amplifier 104 and one end of the network 106 whereas a MOST device of a next adjacent pair serves to connect its (i.e. the next adjacent input tapping 101 to the other amplifier 105 and the other end of the network 106.

Arrangements upon similar lines may be provided for the other switching situations in a manner which will be self-evident to those skilled in the art.

While, in the arrangements so far described, movement of the controlled object along a rectilinear path has been assumed it will be apparent that this is not essential and other movement paths may be used in conjunction with this invention. A particular alternative is rotational movement of an object through a defined angle. In such applications a division ratio of 60 may clearly be preferable in arrangements resembling that of FIG. 3 instead of the 100 division ratio shown for interpolation purposes. This may be achieved by using a divide-by-six stage followed by a divide-by-ten stage.

When very fine grating tracks are employed, for instance, of 1000 lines or more per inch density, as may be the case in precise angular measurement, the quadrature signals derived from the associated photoelectric reading means tend to be of sinusoidal waveform instead of the substantially seriesoidal or triangular shapes as shown in idealized form in FIG. 2. In consequence, the resistance values of the different sections of the associated networks need to follow a sine law instead of a linear law. This makes division by the Kelvin-Varley principle difficult to achieve with the requisite accuracy. Such difficulties can be avoided, in practice, by employing a plurality of alternative tapped networks, each having different component section values, as the second network and then using a particular one of such alternative second networks in accordance with the particular tapping position operative in the first network.

Figure 5:
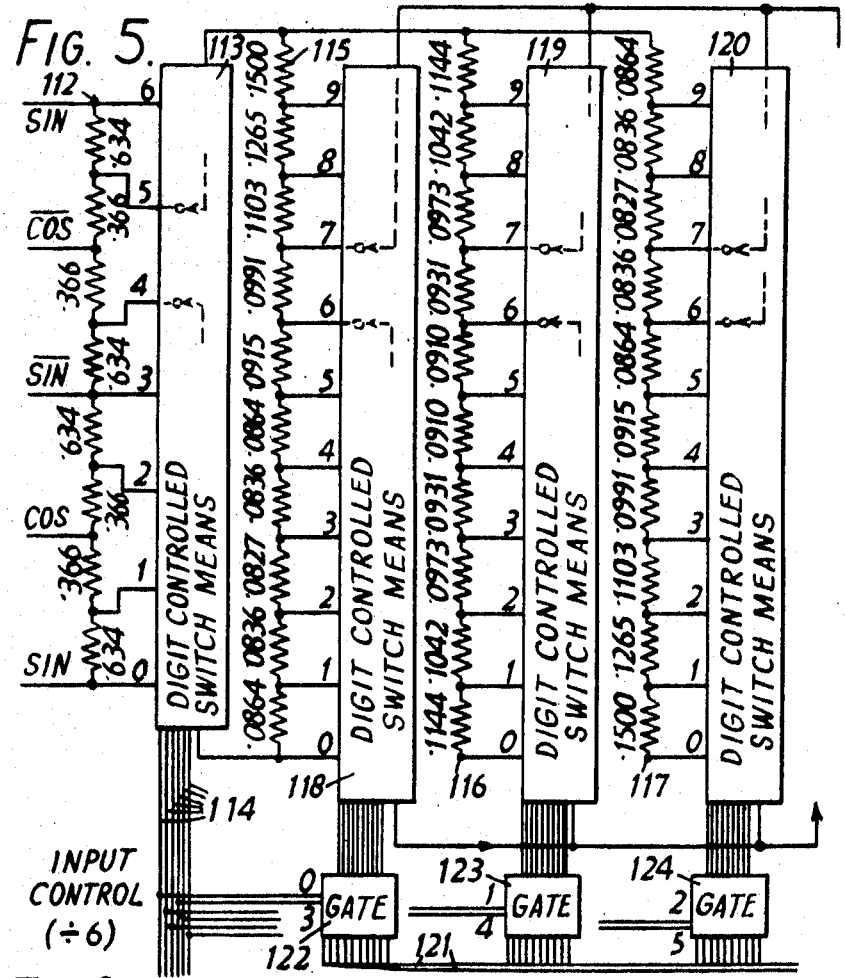
FIG. 5 is a largely schematic diagram illustrating a modified form of Kelvin-Varley divider system used in another embodiment of the invention.

FIG. 5 shows one arrangement of this modified form and using electronic switching of the kind already referred to with reference to FIG. 4. A first resistive network 112 divided into six sections is connected to switching means 113 using MOST devices as in FIG. 4 and controlled by input signals on the appropriate one of the divide-by-six group 114. The output from the tappings provided by the switching means 113 is applied across each of three further resistive networks 115, 116 and 117. Each of the latter has 10 sections and is connected to its own individual switching means 118, 119 and 120. Control of each of these switching means, which also use MOST devices as in FIG. 4, is effected by signals on the appropriate one of the divide-by-ten group of control leads 121. Such control signals, although used for each of the three switching means 118, 119 and 120, are fed to the latter through control gate means 122, 123 and 124 which are in turn controlled by different pairs of the divide-by-six group 114. Thus gate means 122 will be operated to allow the divide-by-ten control signals to operate switching means 118 and the consequent use of network 115 only when the network 112 is being operated with the '0' or '3' setting. Similarly switching means 119 and network 116 are operative only when network 112 is being operated with a '1' or '4' setting while switching means 120 and network 117 become operative only when network 112 is being operated with a '2' or '5' setting. The relative values of the different resistive sections are indicated on the drawing figure against each section. The actual values are, of course, determined by practical circuit considerations.

The balance detector 59 and associated trigger circuit means or any equivalent circuit means may be arranged to operate switch means 54, 62 having the form of a uniselector switch mechanism or, more preferably, for higher speed operation, a reed relay type of stepping switch. For even higher speed operation solid state circuit elements, e.g. MOST devices, arranged as gates may be used and arranged to be driven by an up/down (reversible) counter controlled from the balance detector.

In application of the invention to automatic machine tool control, provision may readily be included for automatic control of the machine to cut curves and tapers instead of direct point-to-point operation as so far described. In one form of such arrangements, as indicated schematically in FIG. 6, for one of the two orthogonal X–Y axes of tool movement, the final group 126 of Kelvin-Varley dividers operated from the finest or measurement grating track 11z is arranged to be stepped forwards or backwards by the output from an up/down ring counter 127 which itself is under the control of an incremental Sine-Cos curve/taper generator circuit 128 supplied with the requisite data from an external data input 129. With such an arrangement the machine tool is caused to be moved in discrete steps of, say, 0.0001 inch along each of the orthogonal XY axes as may be necessary to provide the signalled contour. Absolute checks for position can be made before and after each operation to limit any inaccuracies which may arise.

In application of the invention to automatic machine tool control the input data will normally be provided from some automatic device such as a tape reader. The servo system then operates to move the tool to a position where the grating output signals match the input data. If required, the input data can then be displayed as a digital readout indication at the balance condition. On certain occasions, however, it may be necessary to use the arrangements as a measuring device instead of in a position control mode, the machine itself then being static. A modified arrangement for this purpose is illustrated schematically in FIG. 7 where the balance servo system 130 is arranged so that it can either cause movement of the motor 57 coupled to the tool 10 and the associated grating transducer 11 as already described or, when in the measuring mode, can be arranged to drive the position selector means 131 comprising the Kelvin-Varley network and associated stepping means until a balance condition is established with the position output as defined by the grating outputs. Visual readout means 132 coupled to the position selector means 131 then provide an output indication significant of the actual tool position and hence of the required measurement.

Figure 8:
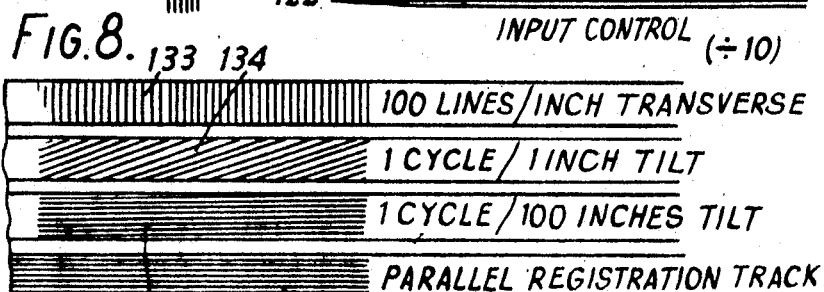
FIG. 8 is a schematic showing of a particular and preferred form of optical grating for association with the movable object.
Figure 10:
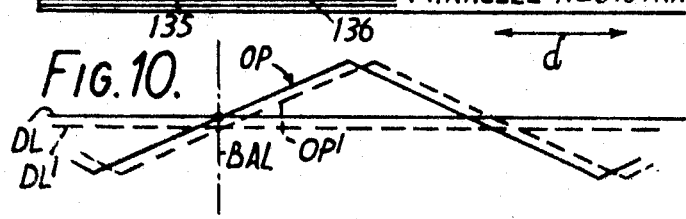
FIG. 10 is an explanatory waveform diagram relevant to the alignment and automatic correction arrangements of FIG. 9.

A preferred form of standard grating is illustrated in FIG. 8. This grating is suitable for use with the arrangement described with reference to FIG. 3 and comprises a finest or measurement grating track 133 of conventional form having a density of 100 lines per inch set precisely transverse to the movement direction d. The next coarser grating track 134 comprises a series of lines at a density of 25 lines to the inch so tilted with respect to the movement direction d that one tilt cycle occurs for each inch of movement. The third, coarsest grating track 135 is similar to the track 134 in that it has a density of 25 lines to the inch but differs in that its lines have a tilt providing one cycle output per 100 inches of movement. The fourth grating track 136 is a registration track with a density of 100 lines to the inch and with the lines set parallel with the length of the other tracks and the direction d. The three distance sensing grating tracks 133, 134, 135 are provided with conventional cooperating index pieces whereby each provides four quadrature output signals arranged as described in the earlier applications to provide stability against lamp brightness and other variation. The fourth, reference, track 136 has associated reading means which provide signals which, after amplification, give 180° phase displaced signals which vary between 0 and 20 volts for each 0.01 inch of transverse movement of the grating system relative to the movement direction d. Such an arrangement permits accurate initial alignment of the grating over its total length by comparison of the output signals derived from such horizontal registration track at the limits of grating travel. In addition the arrangement can provide automatic correction of the outputs from the coarser two of the positioning tracks 134, 135 to safeguard against any undesirable transverse displacement of the tracks while in use. Referring first to FIG. 9, the output from such registration track 136 is applied as one input to a differential servo amplifier 137 from a tapping on a potentiometer network of resistances R1 and R2. A second input to such amplifier is derived through switch means 138 from the position selection means 131 associated with one or other of the two grating tracks 134, 135 included in the grating 11. Selection of the operative track is indicated schematically by the switch means 138. Ganged switch means 139 serve to select alternative values of resistance R2. Referring now to FIG. 10 it will be seen that under correct operating conditions the output OP from the positioning grating track 134 or 135 will cross the zero amplitude datum level DL exactly in coincidence with the required balance position BAL but in the event of any undesirable transverse displacement of the grating track the resultant output will be displaced as shown at OP' and will not then coincide with the correct balance position BAL when at zero amplitude. A false indication accordingly results. By providing a zero datum level input to the amplifier 137, FIG. 9, derived from the registration track the amplitude of this will also be altered by any transverse displacement of the grating as indicated by the dotted line DL'. The positioning of the balance point can thereby be corrected into registration with position BAL.

As there is some variation of the apparent density of the particular track being corrected, it is necessary to alter the ratio of the resistances R1 and R2 which provide for correct positioning of the displaced datum level to match the grating output. This may be achieved by providing alternative resistors R2 selected by the switching means 139.

Arrangements of the kind described can clearly be extended or contracted in accordance with the total travel distance of the movable object and the degree of positional accuracy required. For example a system similar to that of FIGS. 1 and 2 but scaled down by a factor of 10 to provide resolution to 0.0001 inch with a stroke of 1 inch is particularly suitable for use in microelectronics work.

In a modified construction, applicable to either of the systems as described with reference to FIG. 1 or FIG. 3, upon arrival of the switches 54 and 62 at the final position of the balancing sequence, the balance detector action is inhibited after a suitable delay time and a separate out-of-balance control unit is brought into use. Such unit is operative, in the event that the servo is driven out of balance for any reason, e.g. on account of a heavy overload, to cause recommencement of the complete scan cycle from coarse through to finest control. When operating with input data derived from a tape reader or the like, the arrival of new input data is arranged to cause an automatic reset action including return of the switches 54, 62 to their initial positions. When the input data is applied by manual operation of the selector switch means, the least significant digit value is entered last and the operation of this initiates the new operation cycle.

The tolerance of the Kelvin-Varley division network may be enhanced, by the inclusion of an additional resistor in series with the inputs to the final divider networks as shown at 76a and 87a in FIG. 3. Such additional resistors and the resistors 76b, 87b at the opposite ends of the networks have a value equal to half the unit value R of the other resistors of the network.

We claim:

1. An arrangement for controlling the operation of power drive means arranged to cause movement of an object in either direction along a defined movement path in order to position the object in accordance with an applied digital position command, the arrangement comprising electric waveform generating means for generating at least two families of electric waveforms related to the absolute position of said object, each of said families comprising a group of like but phase-displaced waveforms which each pass through a chosen datum level of amplitude at different positions of said object along its movement path, the unit distance displacement between adjacent waveforms of one group being an integral multiple of the unit distance displacement of the other family or families, position selection means operatively connected to said waveform generating means for selecting under said applied digital position command particular position defining waveforms derived one from each of said families of waveforms, datum level detection means operatively connected to said waveform generating means and operative to provide a control signal in response to passage of an applied waveform signal through said datum level, servo control means for causing operation of said power drive means so as to move said object in one or other direction in response to an applied error signal, and cyclically operable step-by-step switch means operatively connected to said datum level detection means and said servo control means for successively applying said selected position defining waveforms in turn and in progressively decreasing order of unit displacement distance to said datum level detection means and said servo control means, said datum level detection means being operatively connected to said step-by-step switch means whereby the control signals from said datum level detection means generated in response to said selected waveforms passing through said datum level are operative to control the step-by-step operation of said cyclically operable switch means.

2. An arrangement in accordance with claim 1 in which said position selection means include at least one Kelvin-Varley divider network in which the position of the twin tappings on a first potentiometric network is controlled in accordance with the signalled value of one input control digit and the position of the tapping position on a second potentiometric network supplied from said twin tappings is controlled in accordance with the signalled value of the input control digit of next lower significance.

3. An arrangement in accordance with claim 2 in which said Kelvin-Varley divider network includes a first potentiometric network having adjustable first twin tappings supplying a second potentiometric network having adjustable second twin tappings supplying a third potentiometric network having an adjustable third tapping, the positions of said first second and third tappings being controlled in accordance with the values of three successive input digits of progressively decreasing order of significance.

4. An arrangement in accordance with claim 3 in which said potentiometric networks are each of resistive character.

5. An arrangement in accordance with claim 2 in which a plurality of second resistive networks having respectively different sectional resistance values are provided and arranged for selective operation in accordance with the signalled value of the input digit controlling the position of the tappings on the first resistive network.

6. An arrangement in accordance with claim 1 in which said electric waveform generating means comprise an optical grating system having a plurality of grating tracks of different unit division dimensions and associated photoelectric reading head means coupled for operation by said movable object.

7. An arrangement in accordance with claim 1 in which said position selection means include manually operable selector switch means for selecting the requisite position defining waveforms.

8. An arrangement in accordance with claim 1 in which said position selection means comprise electrically operable switch means operable by electric input signals representing the input position command digit values.

9. An arrangement in accordance with claim 1 in which said position selection means comprise electronic solid state switching circuit means operable by electric input signals representing the input position command digit values.

10. An arrangement in accordance with claim 1 for use in controlling operation of a machine tool which includes means for progressively changing the selection state of said position selection means in accordance with a series of signalled data input values defining a nonlinear machining operation to be performed by the tool of said machine tool.

11. An arrangement in accordance with claim 10 in which said position selection means comprise electronic solid state switching means and which also comprises a reversible ring counter circuit, data input means for supplying data defining the desired nonlinear machining contour, a contour generator controlled by said data input and providing up/down pulse inputs to said ring counter, the count state output of said counter being operable to control the switching position of said switching means.

12. An arrangement in accordance with claim 1 which includes means for suspending operation of said power drive means by said servo control means and means for progressively altering the position selection state of said position selection means to operate said datum level detection means until balance is established using the position defining waveform of smallest unit distance dimension and visual readout means operable by said position selection means to display the position of said object.

13. An arrangement in accordance with claim 6 in which said optical grating includes a further track having a plurality of equispaced lines and intervening transparent areas lying parallel with the longitudinal dimension of the other position defining tracks, said further track being arranged for cooperation with photoelectric reading head means providing a pair of output signals which vary with an antiphase relationship in response to displacement of the grating in a direction transverse to its movement direction.

14. An arrangement in accordance with claim 13 in which said output signals are operable to provide a variable datum reference signal input to said datum level detection means to provide automatic correction for transverse displacement of said grating.